(12) United States Patent
Ickinger

(10) Patent No.: US 7,144,237 B2
(45) Date of Patent: Dec. 5, 2006

(54) INJECTION UNIT FOR AN INJECTION MOLDING MACHINE

(75) Inventor: Georg Michael Ickinger, Graz (AT)

(73) Assignee: Demag Ergotech GmbH, Schwaig (DE)

( * ) Notice: Subject to any disclaimer, the term of this patent is extended or adjusted under 35 U.S.C. 154(b) by 374 days.

(21) Appl. No.: 10/771,910

(22) Filed: Feb. 4, 2004

(65) Prior Publication Data
US 2004/0156939 A1   Aug. 12, 2004

(30) Foreign Application Priority Data
Feb. 5, 2003   (DE) ............................... 103 04 578

(51) Int. Cl.
*B29C 45/80* (2006.01)
(52) U.S. Cl. ...................... 425/145; 425/542
(58) Field of Classification Search ............... 425/145, 425/542
See application file for complete search history.

(56) References Cited

U.S. PATENT DOCUMENTS

| | | | |
|---|---|---|---|
| 6,309,203 B1 | 10/2001 | Tamaki et al. | |
| 6,394,780 B1 | 5/2002 | Hehl | |
| 6,533,572 B1 | 3/2003 | Koide | |

FOREIGN PATENT DOCUMENTS

| | | |
|---|---|---|
| DE | 198 31 482 C1 | 1/2000 |
| DE | 102 13 679 A | 10/2003 |
| JP | 61140363 | 6/1986 |
| JP | 03 256713 A | 11/1991 |

*Primary Examiner*—Tim Heitbrink
(74) *Attorney, Agent, or Firm*—Henry M. Feiereisen

(57) ABSTRACT

An injection unit for an injection molding machine includes a barrel and a plasticizing screw received in the barrel. An electromotive rotary drive causes the plasticizing screw to rotate and is supported for joint movement with the plasticizing screw in relation to the barrel in direction of an injection stroke. The plasticizing screw and the rotary drive are moved by an electromechanical injection stroke drive to execute the injection stroke. A linear guide is connected to a machine bed for guiding a longitudinal movement of the injection stroke drive and the plasticizing screw. Misalignment of the coaxial disposition of the plasticizing screw, the rotary drive and the injection stroke drive is eliminated by providing a housing shell which is torsionally stiff and moveably accommodates the rotary drive, wherein the plasticizing barrel and the injection stroke drive are connected by the housing shell in a tension-proof manner and supported via the housing shell on the linear guide for longitudinal movement.

9 Claims, 2 Drawing Sheets

INJECTION UNIT FOR AN INJECTION MOLDING MACHINE

CROSS-REFERENCES TO RELATED APPLICATIONS

This application claims the priority of German Patent Application, Serial No. 103 04 578.3-16, filed Feb. 5, 2003, pursuant to 35 U.S.C. 119(a)–(d), the disclosure of which is incorporated herein by reference.

BACKGROUND OF THE INVENTION

The present invention relates, in general, to an injection unit for an injection molding machine.

U.S. Pat. No. 6,309,203 B1 describes an injection unit which includes a U-shaped frame having one leg provided for attachment of a load-carrying bracket for a plasticizing barrel, and another leg for attachment of an injection stroke drive. The frame is supported on the machine bed for linear movement. A rotary drive is disposed between the bracket and the injection stroke drive for movement along guide bars which extend parallel to one another between the legs of the U-shaped frame.

German Pat. No. DE 198 31 482 C1 describes an injection unit in which the plasticizing barrel and the injection stroke drive, as well as the rotary drive to rotate the plasticizing screw, are disposed for linear movement on same guide bars which extend at an elevated disposition with respect to the machine bed.

These conventional injection units suffer shortcomings relating to a risk of deformation of the load-bearing elements in view of significant drive and reaction moments generated by the rotary drive and the injection stroke drive during operations. As a consequence, the injection components, i.e. plasticizing barrel and injection drive, become misaligned, resulting in malfunction or even shutdown of the entire injection unit.

It would therefore be desirable and advantageous to provide an improved injection unit to obviate prior art shortcomings and to maintain reliable operation by effectively eliminating misalignments of injection components under load.

SUMMARY OF THE INVENTION

According to one aspect of the present invention, an injection unit for an injection molding machine, includes a plasticizing barrel, a plasticizing screw received in the plasticizing barrel, an electromotive rotary drive for driving the plasticizing screw to rotate about a rotation direction, said rotary drive being supported for joint movement with the plasticizing screw in relation to the plasticizing barrel in direction of an injection stroke, an electromechanical injection stroke drive for longitudinal movement of the plasticizing screw and the rotary drive to execute the injection stroke, wherein the plasticizing screw, the rotary drive and the injection stroke drive are disposed in coaxial relationship, a linear guide connected to a machine bed for guiding a longitudinal movement of the injection stroke drive and the plasticizing screw, and a housing shell constructed for torsional stiffness and accommodating the rotary drive for movement in the direction of the injection stroke, wherein the plasticizing barrel and the injection stroke drive are connected by the housing shell in a tension-proof manner and supported via the housing shell on the linear guide for longitudinal movement.

The present invention resolves prior art problems by providing as load-carrying component of the injection unit a housing shell which has a torsionally rigid construction and accommodates the injection components and which is capable to absorb impacting drive and reaction moments of the screw drives, without experiencing a deformation, and by supporting the injection unit for longitudinal movement on a linear guide which is mounted on the machine bed. In this way, the coaxial alignment of successively positioned injection components is maintained, even when exposed to great stress during operation.

According to another feature of the present invention, the housing shell can be configured to have at least one portion which is closed in cross section to form a hollow carrier in the area of the injection stroke drive.

According to another feature of the present invention, a guide assembly may be provided for guiding the movement of the rotary drive in longitudinal direction, wherein the guide assembly extends in symmetry to and in a common plane with a central axis of the injection unit. The guide assembly may include guideways which are securely fixed to the housing shell. In this way, an additional safety mechanism is established in case the guideways should slightly deform when exposed to a torque load by the rotary drive, despite the provision of the highly rigid configuration of the housing shell, because the deformations occur in opposition to one another and in radial symmetry to the center axis of the injection unit. Thus, there is no impact on the axial alignment of the injection components.

As an alternative, the guide assembly may include guideways which are connected to the machine bed, with the rotary drive being moveably supported by the guideways independently from the housing shell. Currently preferred, however, is the configuration in which the rotary drive is supported via the guideways on the housing shell so that all loads generated by the screw drives can be compensated along the way via the housing shell. Thus, the machine-bed-side linear guide is substantially liberated from bearing forces and essentially needs to support only the own weight of the injection unit.

According to another feature of the present invention, the injection stroke drive may include a rotary motor, which is fitted in the housing shell that thus forms the motor casing, and a screw mechanism which is operatively connected with the rotary motor. Suitably, the housing shell and/or the rotary drive are roller-bearing mounted on the pertaining guideways or linear guide.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
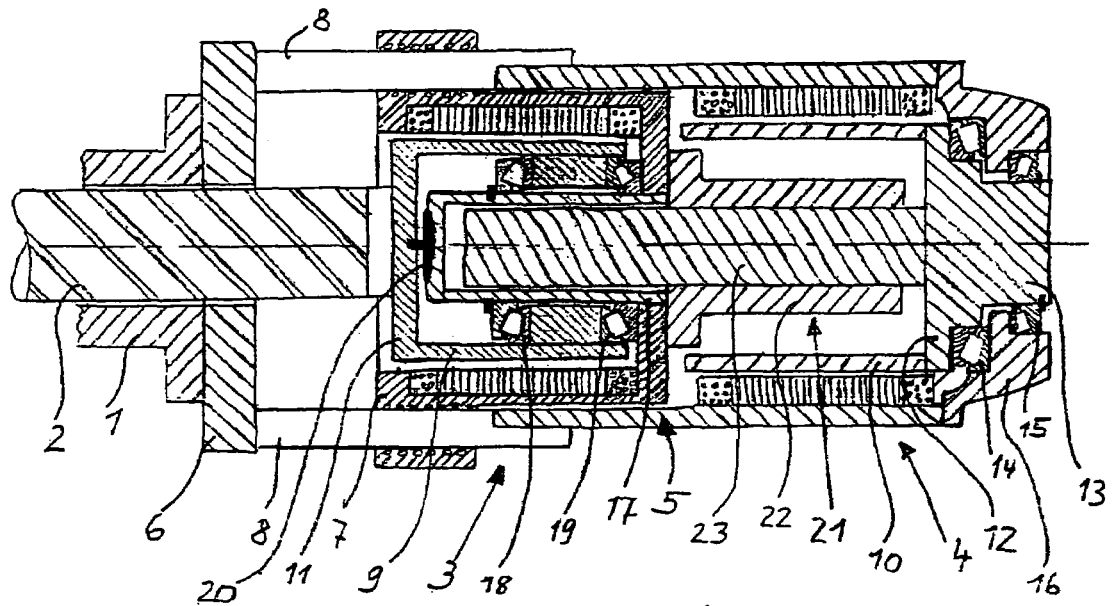
FIG. 1 is a longitudinal section of one embodiment of an injection unit according to the present invention.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom zCXlines, diagrammatic representations and fragmentary views. In certain instances, details which are not necessary for an understanding of the present invention or which render other details difficult to perceive may have been omitted.

Turning now to the drawing, and in particular to FIG. 1, there is shown a longitudinal section of one embodiment of an injection unit according to the present invention, which forms part of an injection molding machine, not shown in more detail for the sake of simplicity. The injection unit includes as main components a plasticizing barrel 1 and a plasticizing screw 2 which is disposed in the bore of the barrel 1. Both, the barrel 1 and the screw 2, are shown here only by way of the rearward end portion. A rotary drive 3 is operatively connected to the screw 2 for rotating the screw 2 in order to plasticize plastic material as it advances during the charging stage, and an injection stroke drive 4 is operatively connected to the screw 2 for the screw 2 to carry out an injection stroke to inject a shot of plastic melt into an injection mold (not shown). The rotary drive 3 and the injection stroke drive 4 are hereby disposed in coaxial disposition and embraced by a housing shell 5. In the area of the injection stroke drive 4, the housing shell 5 is cylindrical in cross section to define a hollow housing portion or carrier 28, whereas the housing shell 5 is semicircular in cross section in a forward area adjacent to the barrel 1 to define a half-shell portion 29. At its forward end, the housing shell 5 is closed by a load-carrying bracket 6 for support of the barrel 1.

The rotary drive 3 includes an electric hollow-shaft motor 9 and the injection stroke drive 4 includes an electric hollow-shaft motor 10. The housing portion 28 of the housing shell 5 forms hereby the casing for the injection stroke drive 4, whereas the rotary drive 3 is accommodated in a housing 7 and roller-bearing mounted on guideways 8 for execution of the injection stroke, with the guideways 8 extending in symmetry to and in a common plane with the central axis A—A of the injection unit and being secured to the housing shell 5. The hollow-shaft motors 9, 10 are arranged back-to-back, with their open rotor ends confronting one another. The stroke-drive-distal end surface of the hollow-shaft motor 9 is closed by an end plate 11, while the rotary-drive-distal end surface of the hollow-shaft motor 10 is closed by an end plate 12. The end plate 12 of the hollow-shaft motor 10 is formed with a central bearing pin 13 for rotatable and axially immobile support of the hollow-shaft motor 10 upon a housing lid 16 for the housing shell 5 through intervention of roller bearings 14, 15 which are oppositely biased and able to transmit longitudinal and transverse forces. The hollow-shaft motor 9 of the rotary drive 3 is rotatably supported with its inner surface area via roller bearings 18, 19 upon a supporting sleeve 17 which is secured to the housing 7 and projects into the interior rotor space of the hollow-shaft motor 9. The roller bearings 18, 19 also transmit hereby longitudinal and transverse forces.

The angle of revolution of the rotor of the hollow-shaft motor 9 and thus the rotation angle of the screw 2, which is firmly secured to the end plate 11 thereof, is measured by a rotary encoder 20 which is arranged between the end plate 11 and the closed end of the supporting sleeve 17 so that the position of the screw 2 can be controlled during the injection stage and the charging stage.

The rotation of the rotor of the hollow-shaft motor 10 is converted into an injection stroke of the rotary drive 3 and thus of the screw 2 by means of a ball screw mechanism, generally designated by reference numeral 21 and including a threaded nut 22, which is fixedly secured in the area of the supporting sleeve 17 with the housing 7 of the rotary drive 3, and a threaded shaft 23, which is threadably engaged by the nut 22 and secured to the end plate 12 of the hollow-shaft motor 10. When the rotary drive 3 moves back to assume a retracted position, as shown in FIG. 1, the threaded nut 22 is disposed in the interior space of the rotor of the hollow-shaft motor 10, while the threaded shaft 23 projects with its free end into the supporting sleeve 17 in the interior rotor space of the hollow-shaft motor 9. As a consequence of the disposition of the ball screw mechanism 21 within the boundaries of both interior spaces of the hollow-shaft motors 9, 10, and the disposition of the roller bearings 18, 19 on the inside of the rotor of the hollow-shaft motor 9 with its magnetic pole assembly, the overall structure of the injection unit is compact and becomes significantly smaller compared to conventional injection units.

Figure 2:
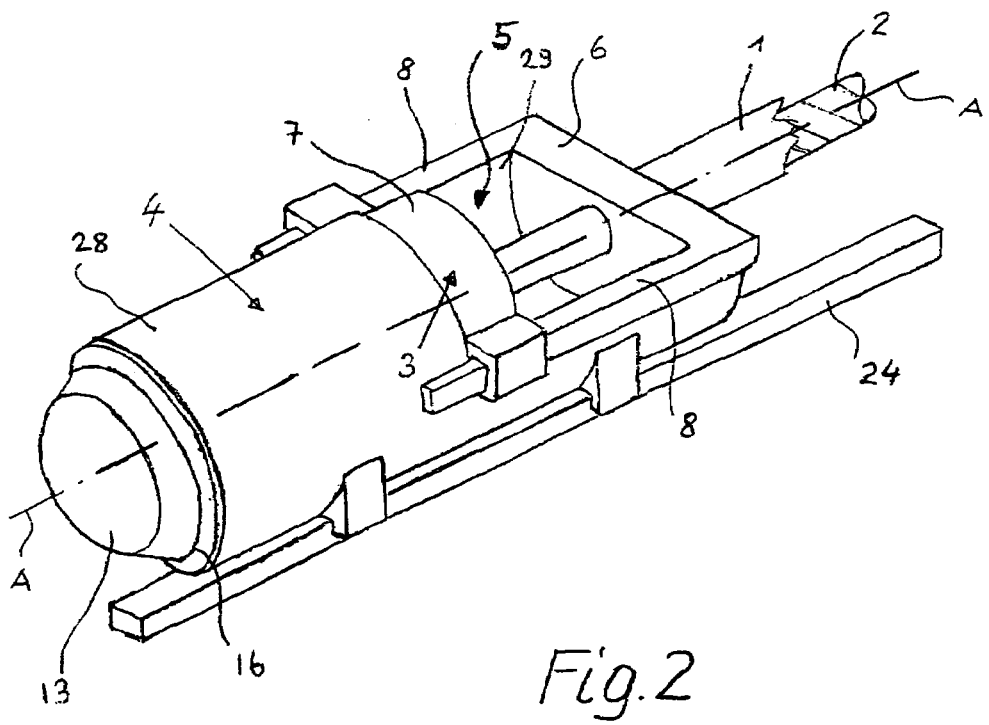
FIG. 2 is a perspective illustration of the injection unit of FIG. 1.

As shown in particular in FIG. 2, the injection unit is mounted on a linear guide in the form of a guide rail 24 which is supported by the machine bed (not shown). In this way, the housing shell 5 can be guided for linear movement along the guide rail 24 via suitable roller or sliding bearings (not shown). As drive and reaction forces of the injection components are compensated, without resulting in deformation, through the provision of the housing shell 5 which is not only tensile-proof but in particular highly resistant to torsion and bending, the linear guide 24 can be dimensioned to only be strong enough to support the own weight of the injection unit as it is substantially liberated from any force impacts. Thus, the use of a simple guide rail 24 as linear guide is sufficient.

Figure 3:
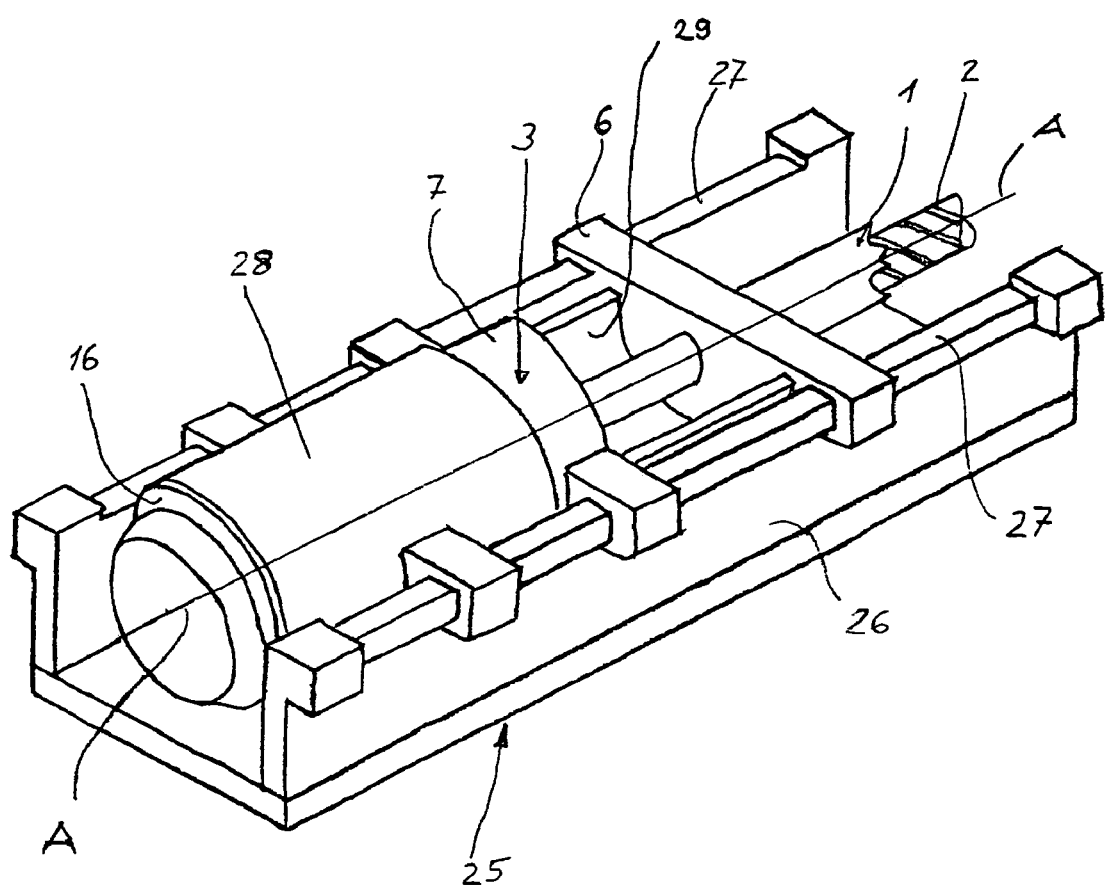
FIG. 3 is a perspective illustration of another embodiment of an injection unit according to the present invention.

Referring now to FIG. 3, there is shown a perspective illustration of another embodiment of an injection unit according to the present invention. Parts corresponding with those in FIGS. 1 and 2 are denoted by identical reference numerals and not explained again. The description below will center on the differences between the embodiments. In this embodiment, the injection unit is mounted on a linear guide, generally designated by reference numeral 25 and including a box-shaped support structure 26 which is placed on the machine bed. The support structure 26 has an upper edge for receiving guide rails 27 by which the housing shell 5 in the area of the bracket 6 and the cylindrically closed housing portion 28, on one hand, and, separate therefrom, the housing 7 of the rotary drive 3 are supported for longitudinal movement via suitable roller or sliding bearings (not shown). Apart from the highly rigid construction of the housing shell 5, the injection unit is further secured against axial misalignment of the injection components as a result of deformations, by supporting both guide rails 27 along their entire length via the supporting structure 26 upon the machine bed in symmetric disposition to and in a common plane with the center axis A—A of the injection unit.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An injection unit for an injection molding machine, comprising:
    a plasticizing barrel;
    a plasticizing screw received in the plasticizing barrel;
    an electromotive rotary drive for driving the plasticizing screw to rotate about a rotation direction, said rotary drive being supported for joint movement with the plasticizing screw in relation to the plasticizing barrel in direction of an injection stroke;
    an electromechanical injection stroke drive for longitudinal movement of the plasticizing screw and the rotary drive to execute the injection stroke, wherein the plasticizing screw, the rotary drive and the injection stroke drive are disposed in coaxial relationship;
    a linear guide connected to a machine bed for guiding a longitudinal movement of the injection stroke drive and the plasticizing screw; and
    a housing shell constructed for torsional stiffness and jointly accommodating the injection stroke drive and the rotary drive, with the rotary drive being supported by the housing shell for movement in the direction of the injection stroke, wherein the plasticizing barrel and the injection stroke drive are connected by the housing shell in a tension-proof manner and supported via the housing shell on the linear guide for longitudinal movement.

2. The injection unit of claim 1, wherein the housing shell is configured to have at least one portion which is closed in cross section to form a hollow carrier.

3. The injection unit of claim 1, and further comprising a guide assembly for guiding the movement of the rotary drive in longitudinal direction, said guide assembly extending in symmetry to and in a common plane with a central axis of the injection unit.

4. The injection unit of claim 3, wherein the guide assembly includes guideways securely fixed to the housing shell for guiding the rotary drive.

5. The injection unit of claim 3, wherein the guide assembly includes guideways connected to the machine bed, said rotary drive being moveably supported by the guideways independently from the housing shell.

6. The injection unit of claim 1, wherein the injection drive includes a motor housing which is formed by the housing shell, a rotary motor which is fitted in the motor-housing-forming housing shell, and a screw mechanism which is operatively connected with the rotary motor.

7. The injection unit of claim 3, and further comprising a roller bearing assembly for supporting the housing shell on the linear guide.

8. The injection unit of claim 5, wherein the housing shell is movably supported on the guideways via a roller bearing assembly.

9. The injection unit of claim 4, wherein the rotary drive is movably supported on the guideways via a roller bearing assembly.

* * * * *